July 22, 1941.  C. L. HALL  2,249,895
FASTENER MEMBER AND FASTENER INSTALLATION
Filed June 8, 1939
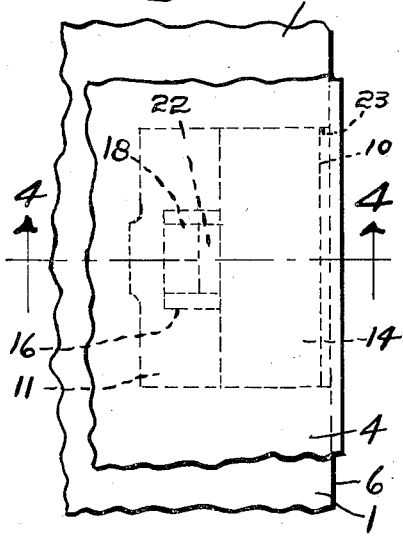
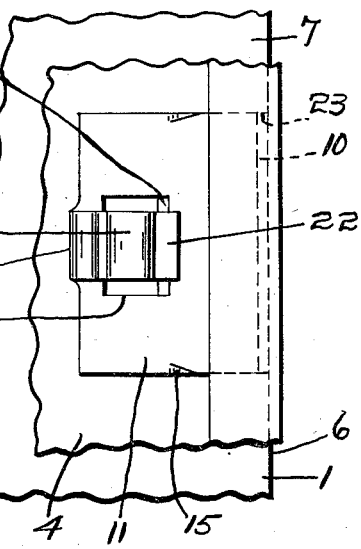
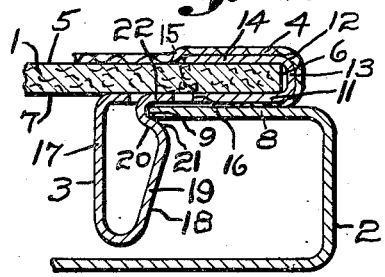
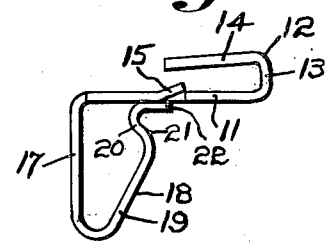
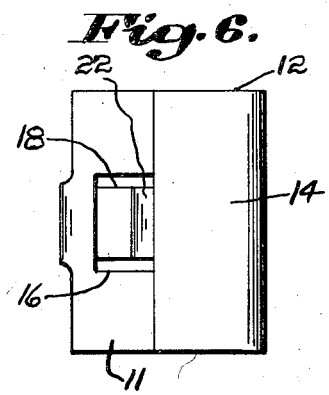
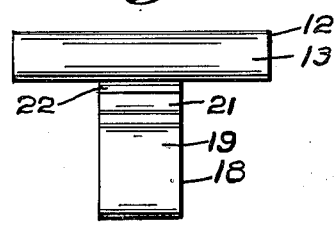
Inventor:
Charles L. Hall.
By John Todd
Atty.

Patented July 22, 1941

2,249,895

UNITED STATES PATENT OFFICE 2,249,895

FASTENER MEMBER AND FASTENER INSTALLATION

Charles L. Hall, Detroit, Mich., assignor to United-Carr Fastener Corporation, Cambridge, Mass., a corporation of Massachusetts Application June 8, 1939, Serial No. 278,073

1 Claim. (Cl. 24—73)

This invention relates to improvements in fastener members and fastener secured installations.

An object of my present invention is an improvement in a fastener member of the type having an attaching portion adapted to be secured over the edge of an upholstery panel and a stud portion extending from the attaching portion for snap fastener engagement with the edge of a flange of a supporting structure.

Heretofore upholstery panels have been provided having means whereby fastener members may be secured to the inner faces of the panels, after which resilient shank portions provided by the fastener members are snapped into engagement with a supporting structure through apertures formed therein. This means enabling the fastener member to be secured to the panel may take several forms. One of the methods most commonly used is to provide an opening in the panel spaced from the marginal edges thereof for receiving one of the arms of a U-shaped attaching portion whereby the arms cooperate to grip opposed surfaces of the panel. One of the features of my present invention is contained in the particular construction of the fastener member enabling it to be secured in fixed relation to an imperforate panel through moving an attaching portion provided by the fastener member over a marginal edge of the panel.

Another object of my invention is directed to the particular construction of the fastener member enabling the upholstery panel to be drawn into close engagement with the supporting structure when the parts of the installation are assembled together.

Other objects and uses of my invention will be apparent from inspection of the drawing and specification hereinbelow set forth.

Referring to the drawing, in which I have illustrated a preferred embodiment of my invention:

Fig. 1 is a top plan view of a portion of an upholstery panel installation with one of my improved fastener members assembled therewith;

Fig. 2 is a plan view of a portion adjacent the marginal edge of an upholstery panel;

Fig. 3 is a bottom plan view of the upholstery panel installation shown in Fig. 1;

Fig. 4 is a sectional view taken along the line 4—4 of Fig. 1 and showing the upholstery panel secured to a supporting structure;

Fig. 5 is a side plan view of my improved fastener member per se;

Fig. 6 is a top plan view of the fastener member shown in Fig. 5; and

Fig. 7 is a front plan view of my improved fastener member per se.

My invention, as illustrated by the drawing, is particularly, though not exclusively, directed to the art of securing upholstery covered panels to the inside structure of a motor vehicle or other frame structure. Referring to a preferred installation of my fastener member illustrated in Fig. 4 of the drawing, I have shown a relatively stiff panel 1 of cardboard, fiberboard or the like secured to a supporting structure 2, which may be the frame of an automobile, by means of my improved fastener member 3. A covering 4 extends over the outer surface 5 of the panel 1 and is folded over the marginal edge 6 and secured to the inner surface 7 of the panel in a manner well known in the art. The supporting structure 2 is of the type providing an inwardly-extending flange portion 8 having an innermost free edge 9, as shown in Fig. 4. Recesses 10 are formed in the marginal edges of the panel 1 for receiving an attaching portion of the fastener member 3 and cooperating with the attaching portion to prevent relative movement of the parts in a manner to be described.

Referring in detail to my improved fastener member 3, I have shown one formed of one piece of sheet metal and providing an attaching portion for engagement with the panel 1 whereby the fastener member is secured thereto and a stud portion extending from the attaching portion for cooperative fastener engagement with the edge 9 of the supporting structure 2. The attaching portion of my fastener member comprises a base portion 11 which is preferably flat and a flange portion 12 extending outwardly from the base portion 11. The flange portion 12 comprises a connecting portion 13 extending in rightangular relation to the normal plane of the base 11 and a panel-engaging portion 14 extending in superposed substantially parallel spaced relation to the base portion 11. The panel-engaging portion 14 may project slightly in the direction of the base 11 in normal position, as shown in Fig. 5. Prong portions 15, which are preferably cut from the marginal edges of the base portion 11, are disposed beneath the panel-engaging portion 14 and extend toward the same for a purpose to be described. The base portion 11 has an opening 16 formed therein adapted to receive a portion of the stud portion when the parts of the installation are finally assembled together enabling the upholstery panel to be drawn into flush engagement with the flange 8 of the supporting structure 2.

The stud portion of my fastener member comprises a leg 17 integrally joined to an opposite edge of the base portion 11 from that from which the connecting portion 13 extends. The leg 17 extends downwardly in substantially right-angular relation to the normal plane of the base 11 and a leg portion 18 integrally joined to the end of the leg 17 away from the base portion 11 extends upwardly toward the base portion. The leg portion 18 is free at its outermost end enabling the same to yield relative to the leg 17. In my preferred form of fastener member the leg portion 18 has a camming portion 19 diverging away from the leg 17 and a portion 20 converging toward the leg 17 so as to form a shoulder 21. A lip portion 22 integrally joined to the converging portion 20 extends laterally outwardly relative to the normal axis of the stud portion in substantially parallel relation to the base 11. Thus the lip portion 22 cooperates with the shoulder 21 to form a seat for receiving the edge 9 of the flange 8. The lip portion 22 is normally disposed outside the plane of the base portion 11 and in predetermined relation to the opening 16 of the base 11 whereby it may move into the plane of the base 11 within the opening 16 when the stud portion is entered into fastener engagement with the support 2. The width of the legs 17 and 18 is preferably substantially less than the dimension of the attaching portion on a line parallel to the edge 6 of the panel 1 when the fastener member is secured to the same.

Assembly of the parts of my installation is a relatively simple matter and is carried out through moving the attaching portion of the fastener member over the marginal edge 6 of the panel 1 substantially at the recess 10 so as to dispose the connecting portion 13 of the attaching portion within the recess 10 with the base portion 11 engaging the inner surface 7 of the panel and the portion 14 engaging the outer surface 5 of the same. As a result of the fact that the normal distance between the base 11 and panel-engaging portion 14 is normally less than the thickness of the panel, the panel is firmly gripped between the portions 11 and 14 and the prongs 15 tend to embed themselves in the panel preventing ready removal of the attaching portion laterally relative to the edge 6 of the panel. Movement of the fastener member along the panel longitudinally of the edge 6 is prevented by the ends 23 of the recess 10 which cooperate with the connecting portion 13 to provide stops. After the covering 4 is assembled with the panel, the complete panel installation is ready for attachment to the support 2. To assemble the panel with the support 2, the panel is moved toward the flange 8 of the support to engage the diverging portion 19 of the stud portion with the edge 9 of the flange 8. The diverging portion 19 acts as a cam to compress the leg 18 sufficiently to enable the shoulder 21 to pass the flange edge 9, at which time the leg 18 expands to engage the shoulder 21 behind the flange 8. During compression of the leg 18, the lip portion 22 is moved from normal position outside of the plane of the base 11 into the plane of the base within the opening 16 thereof with the result that the inner side of the upholstery panel is brought into flush relation with the flange 8 of the support.

Thus by my invention I have provided an improved fastener member adapted to be quickly and easily secured to a supporting panel and having means cooperating with the panel preventing relative movement of the parts. Although I have chosen to illustrate one only of the fastener members in assembly with the upholstery panel, it is understood that as many fasteners may be secured to the panel as may be necessary for a proper attachment of the panel to a support.

Although I have illustrated and described a preferred embodiment of my invention, I do not wish to be limited thereby because the scope of my invention is best defined in the following claim.

I claim:

A fastener secured installation comprising, in combination, a support having a flange providing a surface to be covered by an upholstery panel, an upholstery panel to be secured to said support to cover said surface, and a fastener member in assembly with said panel adapted for snap fastener engagement with the edge of said flange to secure said panel to said support, said fastener member comprising an attaching portion having a base engaging one side of said panel and a portion substantially parallel to said base engaging an opposite side of said panel, a stud portion integral with said base comprising a pair of legs joined at their ends away from said base, one of said legs extending free in the path of said flange edge prior to engagement with said flange, said last-mentioned leg having a shoulder for snap fastener engagement with the edge of said flange and a lip portion at its free end spaced from said shoulder and cooperating with said shoulder to form a seat for said flange edge therebetween, said base having an opening to receive said lip, and said snap fastener engagement of said last-mentioned leg operating to draw said upholstery panel tightly to said surface of said flange and at the same time move said lip into said recess whereby said fastener member presents a single thickness of material between said surface covered by said upholstery panel and the side of said panel adjacent said surface.

CHARLES L. HALL.